US00RE36192E

United States Patent [19]

Lee et al.

[11] E Patent Number: Re. 36,192

[45] Reissued Date of Patent: Apr. 27, 1999

[54] LOTTO NUMBER SELECTOR

[76] Inventors: Gary S. Lee; Barbara M. Lee, both of 2742 Mimosa Dr., Shreveport, La. 71108

[21] Appl. No.: 29/053,001

[22] Filed: Mar. 20, 1996

Related U.S. Patent Documents

Reissue of:

[64] Patent No.: Des. 360,902
Issued: Aug. 1, 1995
Appl. No.: 29/017,170
Filed: Jan. 6, 1994

[51] LOC (6) Cl. ..... 21-02

[52] U.S. Cl. ..... D21/37

[58] Field of Search ..... D21/14, 21, 22, D21/37, 39, 6; 273/138 R, 138 S, 139, 141 R, 141 S, 142 R, 269, 274, 236

[56] References Cited

U.S. PATENT DOCUMENTS

| | | | |
|---|---|---|---|
| D. 222,550 | 11/1971 | Faltico, Jr. | D21/39 |
| D. 345,385 | 3/1994 | Palatin | D21/37 |
| 2,339,351 | 1/1944 | Myers | 273/141 |
| 2,676,019 | 4/1954 | Steinberg | 273/141 |
| 3,117,790 | 1/1964 | White | 273/134 |
| 3,233,345 | 2/1966 | Smith | 35/31 |
| 4,421,316 | 12/1983 | Brown | 273/274 |
| 5,118,110 | 6/1992 | Jones | 273/141 |

*Primary Examiner*—Terry A. Wallace
*Attorney, Agent, or Firm*—John M. Harrison

[57] CLAIM

The ornamental design for a lotto number selector, as shown and described.

DESCRIPTION

FIG. 1 is a front elevation view of a lotto number selector, showing our new design;
FIG. 2 is a top view thereof;
FIG. 3 is a bottom plan view thereof; and,
FIG. 4 is a side elevation view thereof.
The undisclosed rear view is planar and unornamented except for the round pin that is identical to the front center pin.

1 Claim, 1 Drawing Sheet

Figure 1:
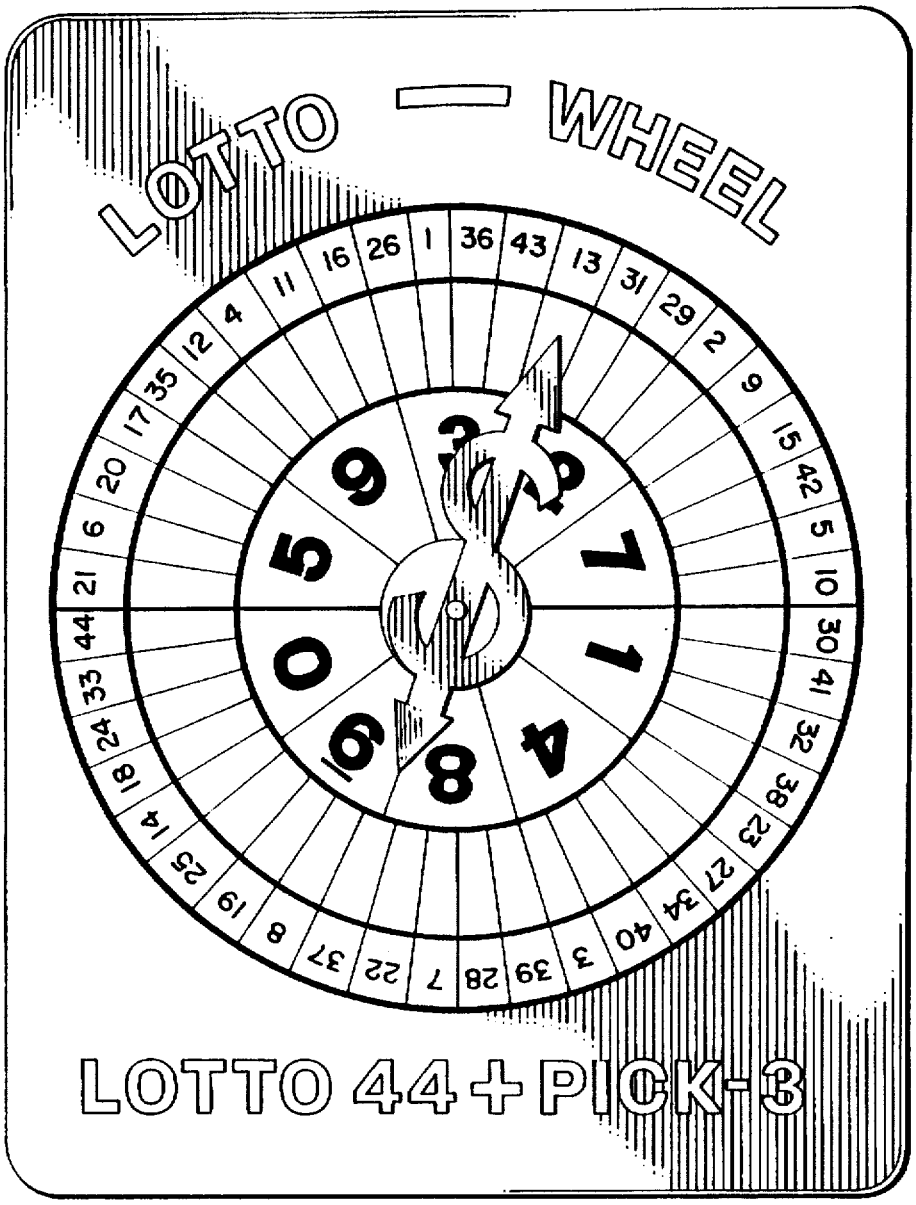
Figure 4:
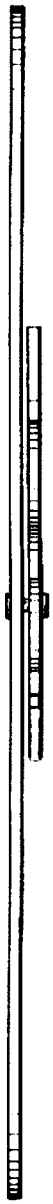
Figure 2:
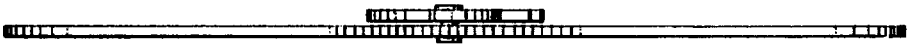
Figure 3:
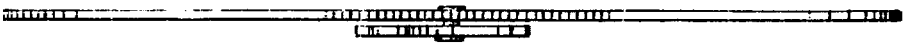

Matter enclosed in heavy brackets [ ] appears in the original patent, but forms no part of this reissue; matter printed in italics indicates the additions made by reissue.